United States Patent
Honda et al.

(10) Patent No.: US 9,256,010 B2
(45) Date of Patent: Feb. 9, 2016

(54) THERMOCHROMIC RESIN COMPOSITE, METHOD FOR ADJUSTING CLOUDING POINT OF THERMOCHROMIC RESIN COMPOSITE, AND DIMMER

(75) Inventors: Satoshi Honda, Tokyo (JP); Takuya Yamamoto, Tokyo (JP); Yasuyuki Tezuka, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 503 days.

(21) Appl. No.: 13/806,035

(22) PCT Filed: Jun. 21, 2011

(86) PCT No.: PCT/JP2011/003516
§ 371 (c)(1),
(2), (4) Date: Dec. 20, 2012

(87) PCT Pub. No.: WO2011/161940
PCT Pub. Date: Dec. 29, 2011

(65) Prior Publication Data
US 2013/0092888 A1    Apr. 18, 2013

(30) Foreign Application Priority Data
Jun. 25, 2010    (JP) ................. 2010-145198

(51) Int. Cl.
| | | |
|---|---|---|
| *G02F 1/00* | (2006.01) | |
| *G02F 1/361* | (2006.01) | |
| *G02B 5/00* | (2006.01) | |
| *C09K 9/02* | (2006.01) | |
| *C08G 83/00* | (2006.01) | |
| *C08F 283/06* | (2006.01) | |
| *C08F 293/00* | (2006.01) | |
| *C08L 53/00* | (2006.01) | |
| *G02F 1/01* | (2006.01) | |

(52) U.S. Cl.
CPC ................ *G02B 5/00* (2013.01); *C08F 283/06* (2013.01); *C08F 293/005* (2013.01); *C08G 83/008* (2013.01); *C08L 53/00* (2013.01); *C09K 9/02* (2013.01); *C09K 2211/14* (2013.01); *G02F 1/0147* (2013.01)

(58) Field of Classification Search
CPC ........ G02B 5/00; C09K 9/02; C09K 2221/14; C08J 2323/06; G02F 1/0147
USPC ................ 252/583, 582; 106/47; 204/157.15; 359/350; 424/59
See application file for complete search history.

(56) References Cited

U.S. PATENT DOCUMENTS 5,188,760 A    2/1993    Hikmet et al.

FOREIGN PATENT DOCUMENTS

| JP | 2000-155345 A | 6/2000 |
| JP | 2000-354952 A | 12/2001 |
| WO | 01-354952 | * 12/2001 |

OTHER PUBLICATIONS

Kuramasu et al, JP 2001-354952 Machine Translation, Dec. 25, 2001.*
Adachi et al, ATRP-RCM Synthesis of Cyclic Diblock Copolymers, Oct. 8, 2008, Macromolecules, 41, 7898-7903.*
Adachi, et al., "ATRP-RCM Synthesis of Cyclic Diblock Copolymers", Macromolecules, vol. 41, pp. 7896-7903, 2008.
Adachi, et al., "ATRP-RCM Synthesis of Cyclic Diblock Copolymers", Macromolecules, vol. 41, pp. 7898-7903, 2008 (Supporting Information).
International Search Report dated Aug. 16, 2011, as issued in corresponding International Patent Application No. PCT/JP2011/003516, filed Jun. 21, 2011.

* cited by examiner

*Primary Examiner* — Ling Choi
*Assistant Examiner* — Jessica E Whiteley
(74) *Attorney, Agent, or Firm* — Maier & Maier, PLLC

(57) ABSTRACT

Disclosed are a thermochromic resin composite and a dimmer allowing easy adjustment of a clouding point. The thermochromic resin composite is predominantly composed of an aqueous medium, an amphiphilic linear polymer changeable between a transparent state and an opaque state in the aqueous medium depending on temperature, and an amphiphilic endless polymer changeable between a transparent state and an opaque state in the aqueous medium depending on temperature, and the amphiphilic linear polymer and the amphiphilic endless polymer in the aqueous medium have one clouding point, the clouding point changing in accordance with a mixing ratio of the amphiphilic linear polymer to the amphiphilic endless polymer.

9 Claims, 12 Drawing Sheets

THERMOCHROMIC RESIN COMPOSITE, METHOD FOR ADJUSTING CLOUDING POINT OF THERMOCHROMIC RESIN COMPOSITE, AND DIMMER

RELATED APPLICATIONS

This is the U.S. national stage application which claims priority under 35 U.S.C. §371 to International Patent Application No.: PCT/JP2011/003516 filed on Jun. 21, 2011, which claims priority to Japanese Patent Application No. 2010-145198 filed on Jun. 25, 2010, the disclosures of which are incorporated by reference herein their entireties.

TECHNICAL FIELD

The present invention relates to a thermochromic resin composite, a method for adjusting a clouding point of a thermochromic resin composite, and further relates to a dimmer including the thermochromic resin composite as an optical element.

BACKGROUND ART

A dimmer including an optical element that controls the light transmitting state is known. The dimmer can block or open the view of a user by controlling two optical states, transmitting and scattering, and therefore the application and development to various uses including construction materials such as a room divider and an outside window are expected.

As a light control method used in the dimmer, liquid crystal dimming method (for example, Patent Literature 1), electrochromic dimming method, photochromic dimming method, and thermochromic dimming method (for example, Patent Literatures 2 and 3) are proposed.

The liquid crystal dimming is a dimming method that reversibly changes between the transparent state and the opaque state by inducing a change in orientation of liquid crystal molecules using voltage application. The electrochromic dimming is a dimming method that reversibly changes between the transparent state and the colored state using electrochemical reaction. The photochromic dimming is a dimming method that reversibly changes the colored state by the presence or absence of active ray irradiation.

The thermochromic dimming is a dimming method that controls the optical physics of materials by heat, and one of such method reversibly changes the transparent state and the opaque state using a clouding point phenomenon by aggregation or dispersion of molecules that occurs due to a change in temperature. Thermochromic materials include a liquid or gel material using aqueous solution with non-ionic detergents or non-ionic water-soluble polymers exhibiting the clouding point phenomenon by aggregation or dispersion, a material using semiconductor-to-metal phase transition such as vanadium dioxide and the like. Note that Non Patent Literature 1 is referred to in the embodiment described later.

CITATION LIST

Patent Literature

PTL 1: U.S. Pat. No. 5,188,760
PTL 2: Japanese Unexamined Patent Application Publication No. 2001-354952
PTL 3: Japanese Unexamined Patent Application Publication No. 2000-155345

Non Patent Literature

NPL 1: K. Adachi, et al., Macromolecules, 2008, 41, pp. 7898-7903

SUMMARY OF INVENTION

Technical Problem

The liquid crystal dimming and the electrochromic dimming cause an increase in device size and cost because a voltage application system is required. The photochromic dimming also causes the same problem because an optical system that controls active rays is required.

In the thermochromic dimming also, the same problem may occur in the case of using a temperature control system; however, in the case of using an ambient temperature, a special facility or system is not required. In this case, it is essential to set the clouding point at a desired temperature according to purpose and need.

However, it is not easy in practice to set the clouding point at a desired temperature according to a variety of purposes and needs, and there has been a limit to application and development. Accordingly, if a thermochromic material where the clouding point can be easily designed according to purpose and need can be provided, it is expected to significantly enlarge the use range of the dimmer.

The present invention has been accomplished to solve the above problems and an object of the present invention is thus to provide a thermochromic resin composite having a clouding point that is easily adjustable, a method for adjusting a clouding point of a thermochromic resin composite, and a dimmer.

Solution to Problem

The present inventors have made intensive studies on the basis of the above problem and found that the above problem can be solved by the following ways, and thereby accomplished the present invention. Specifically, a thermochromic resin composite according to the present invention is predominantly composed of an aqueous medium, an amphiphilic linear polymer changeable between a transparent state and an opaque state in the aqueous medium depending on temperature, and an amphiphilic endless polymer changeable between a transparent state and an opaque state in the aqueous medium depending on temperature, and the amphiphilic linear polymer and the amphiphilic endless polymer in the aqueous medium have one clouding point, the clouding point changing in accordance with a mixing ratio of the amphiphilic linear polymer to the amphiphilic endless polymer.

A dimmer according to the present invention is a dimmer including an optical element having a light transmittance decreasing at high temperature and increasing at low temperature, the dimmer including the above-described thermochromic resin composite as the optical element.

A method for adjusting a clouding point of a thermochromic resin composite according to the present invention includes preparing an amphiphilic linear polymer having a clouding point A at which a transparent state and an opaque state change reversibly in an aqueous medium depending on temperature, and an amphiphilic endless polymer having a clouding point B at which a transparent state and an opaque state change reversibly in the aqueous medium depending on temperature, and adjusting a mixing ratio of the amphiphilic linear polymer to the amphiphilic endless polymer mixed in the aqueous medium so as to have a desired clouding point C at which a transparent state and an opaque state change reversibly, the clouding point C being different from the clouding point A and the clouding point B and within a temperature range of the clouding point A and the clouding point B.

Advantageous Effects of Invention

The present invention has advantageous effects that it is possible provide a thermochromic resin composite having a clouding point that is easily adjustable, a method for adjusting a clouding point of a thermochromic resin composite, and a dimmer.

DESCRIPTION OF EMBODIMENTS

An example of an embodiment of the present invention is described hereinbelow. Note that other embodiments are included within the scope of the present invention as a matter of course as long as they do not deviate from the gist of the present invention. Further, the size and proportion of each element in the following drawings are just for the convenience of description and different from their actual size and proportion.

Figure 1A:
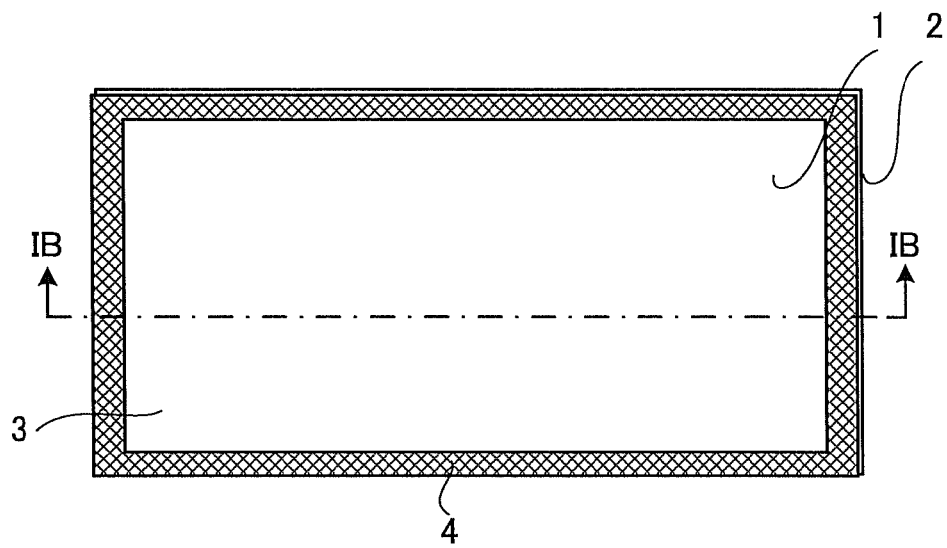
FIG. 1A is a schematic plan view of a dimmer according to the embodiment.
Figure 1B:
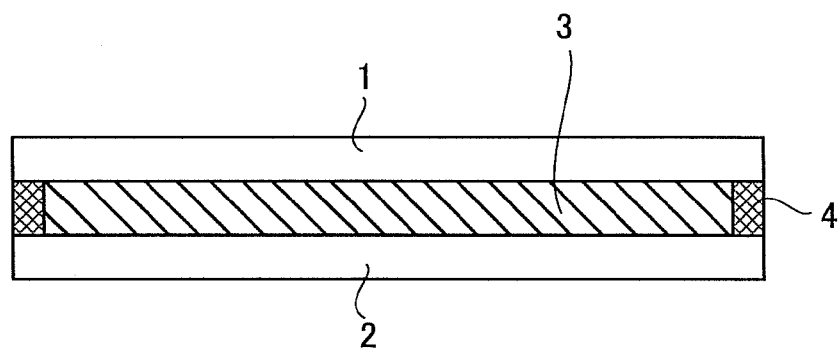
FIG. 1B is a cross-sectional view along line IB-IB in FIG. 1A.

FIG. 1A is a schematic plan view schematically showing the structure of a dimmer according to the embodiment, and FIG. 1B is a cross-sectional view along line IB-IB in FIG. 1A. A dimmer 100 according to the embodiment includes a first light transmitting plate 1, a second light transmitting plate 2, a thermochromic resin composite 3, which is an optical element, and a sealing material 4, as shown in FIGS. 1A and 1B.

The first light transmitting plate 1 and the second light transmitting plate 2 are rectangular flat plates of substantially the same size and placed opposite to each other. The first light transmitting plate 1 and the second light transmitting plate 2 are placed on the front side and the rear side of the dimmer 100 so as to protect the inside of the dimmer 100 and serve as a housing. Note that the first light transmitting plate 1 and the second light transmitting plate 2 (which are hereinafter referred to collectively as "first light transmitting plate 1 and the like") are not limited to flat plates, and they may be curved plates, for example. Further, the shape of the first light transmitting plate 1 and the like may be designed as appropriate according to purpose and need.

As the material of the first light transmitting plate 1 and the like, glass or transparent resin such as polycarbonate may be used, for example. A colored light transmitting plate may be used. In terms of weight saving, it is preferred to use resin. A film such as an antireflection film or a colored film may be attached onto the surface of the first light transmitting plate 1 and the like according to need.

The sealing material 4 is placed to enclose the edge of the gap between the first light transmitting plate 1 and the second light transmitting plate 2. The thermochromic resin composite 3 is sealed within the space surrounded by the first light transmitting plate 1, the second light transmitting plate 2 and the sealing material 4. The area where the thermochromic resin composite 3 is placed is a dimming area. In other words, it is an area where the transparent state and the opaque state can be controlled in a reversible manner at a specified boundary temperature. Note that, although the example in which the sealing material 4 is placed at the edge of the first light transmitting plate 1 and the like is shown, when a dimming area is provided only partly, a sealing material that encloses that area is formed.

Note that the dimmer 100 may include other component members as a matter of course. For example, a space to keep the gap between the first light transmitting plate 1 and the second light transmitting plate 2 may be placed.

The thermochromic resin composite 3 is predominantly composed of an aqueous medium, an amphiphilic linear polymer that reversibly changes between the transparent state and the opaque state in the aqueous medium depending on temperature, and an amphiphilic endless polymer that reversibly changes between the transparent state and the opaque state in the aqueous medium depending on temperature. In the following description, the amphiphilic linear polymer and the amphiphilic endless polymer are also referred to collectively as an amphiphilic mixed polymer.

The aqueous medium may be in the form of gel or liquid with a low viscosity. Further, in addition to the amphiphilic linear polymer and the amphiphilic endless polymer, a stabilizer, a dispersant or the like may dissolve or be dispersed in the aqueous medium.

As the amphiphilic mixed polymer, the one having a single clouding point in the aqueous medium, the clouding point changing in accordance with the mixing ratio of the amphiphilic linear polymer to the amphiphilic endless polymer, is used. In other words, the amphiphilic mixed polymer in which the amphiphilic linear polymer and the amphiphilic endless polymer, when mixed, do not exhibit their specific clouding points but have a single new clouding point in accordance with the mixing ratio is used.

The "clouding point" is a temperature at which the thermochromic resin composite rapidly changes from transparent to opaque when its temperature is raised. The degree of opacity may be set as appropriate according to purpose. In the case of recognizing the opaque state by visual observation, the temperature is set at which the transmitted light at 600 nm decreases by 10%, for example. In order to set the highly opaque state, the temperature may be set at which the transmitted light at 600 nm decreases by 30%. On the other hand, in the case of determining between the transparent state and the opaque state by a highly sensitive sensor or the like, the temperature is set at which the transmitted light at 600 nm decreases by 5%, for example. Accordingly, the temperature of the "clouding point" varies depending on purpose and usage.

The clouding point arises due to the fact that the molecular motion of the polymer becomes active upon reaching a high temperature, causing an associate like a micelle not to be maintained and an aggregate to be formed. In the amphiphilic linear polymer, the mobility at the end of the molecular chain is high. On the other hand, in the amphiphilic endless polymer, the mobility is low because it has no end structure. Focusing on this property, the amphiphilic linear polymer and the amphiphilic endless polymer with different clouding points are mixed, thereby enabling easy setting of a clouding point between the clouding point of the amphiphilic linear polymer and the clouding point of the amphiphilic endless polymer, in accordance with the mixing ratio.

When the temperature is dropped from the aggregate formation temperature, the aggregate is transformed back into the associate like a micelle, and accordingly it changes from the opaque state to the transparent state. Thus, the thermochromic resin composite according to the present invention can reversibly change between the transparent state and the opaque state.

Figure 2A:
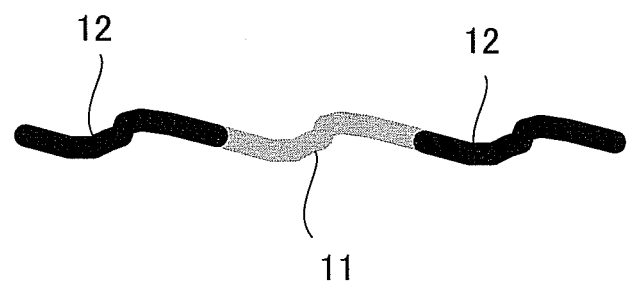
FIG. 2A is a schematic view of an amphiphilic linear polymer according to the embodiment.
Figure 2B:
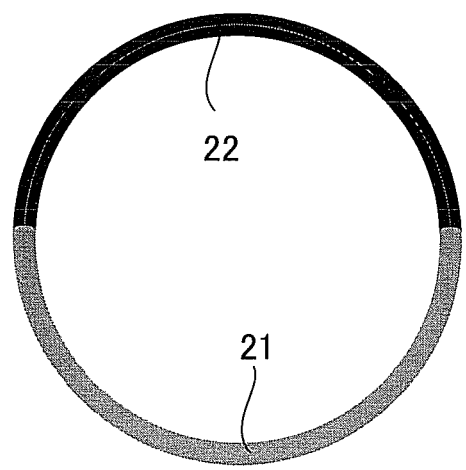
FIG. 2B is a schematic view of an amphiphilic endless polymer according to the embodiment.

FIG. 2A shows a schematic view of an amphiphilic linear polymer 10 according to the embodiment, and FIG. 2B shows a schematic view of an amphiphilic endless polymer 20 according to the embodiment. The amphiphilic linear polymer 10 has a triblock structure in which linear hydrophobic units 12 are at both ends of a linear hydrophilic unit 11. The amphiphilic endless polymer 20 has a single-ring structure with a diblock structure of a hydrophilic unit 21 and a hydrophobic unit 22.

In order that the amphiphilic mixed polymer has a single clouding point in the aqueous medium and that the clouding point varies depending on the mixing ratio of the amphiphilic linear polymer 10 to the amphiphilic endless polymer 20, the amphiphilic linear polymer 10 and the amphiphilic endless polymer 20 need to be a combination that gives rise to a mixed associate and a mixed aggregate. When the amphiphilic linear polymer 10 and the amphiphilic endless polymer 20 respectively give rise to a self-associate and a self-aggregate by themselves, the clouding point is exhibited in each polymer; however, with formation of a mixed associate and a mixed aggregate, the clouding point can be controlled to one.

Figure 3:
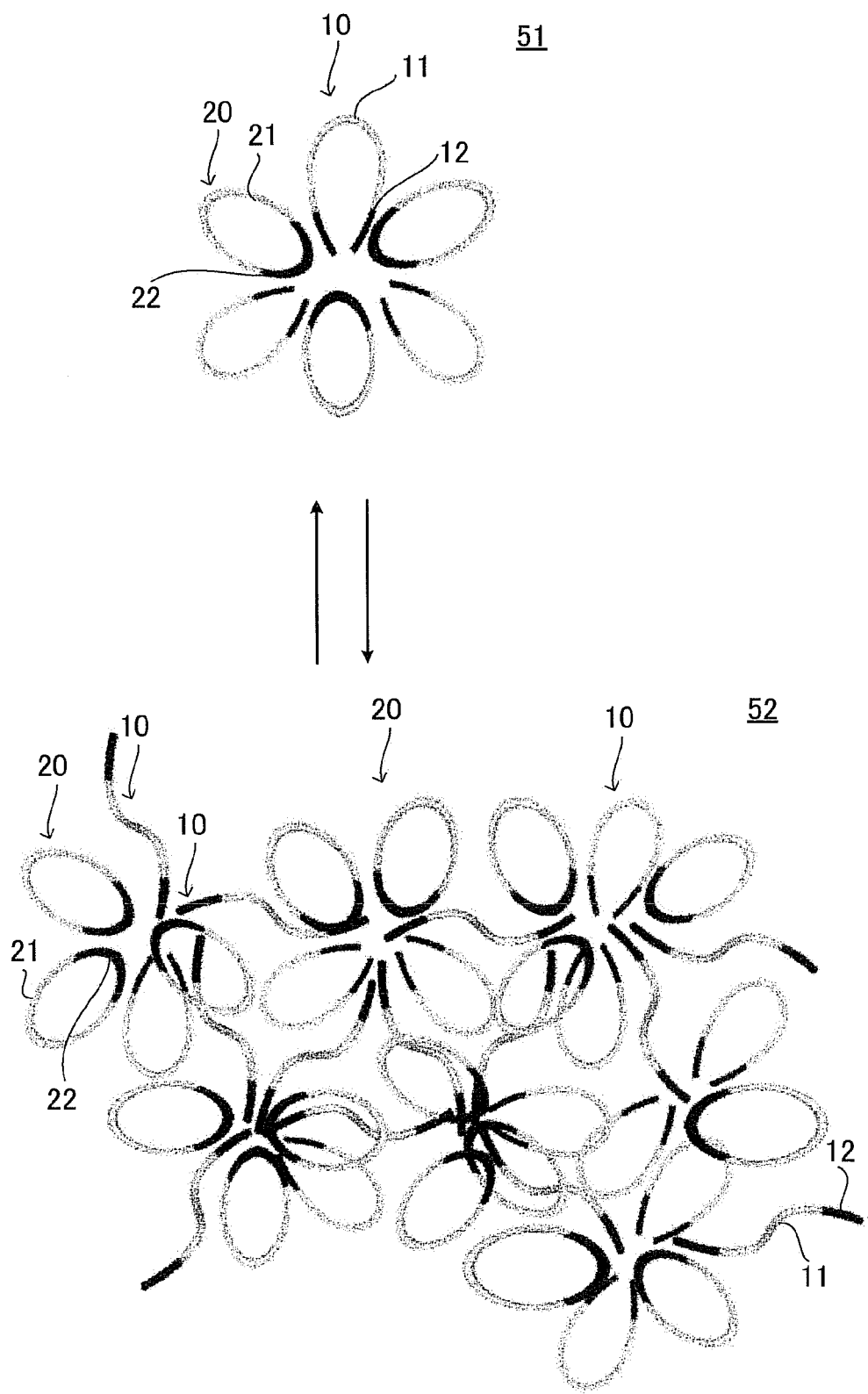
FIG. 3 is a schematic view showing a mixed associate and a mixed aggregate of a thermochromic resin composite according to the embodiment.

FIG. 3 is a schematic view showing a mixed associate 51 and a mixed aggregate 52 of the thermochromic resin composite 3 according to the embodiment. The mixed associate 51 has a micellar structure formed by the amphiphilic linear polymer 10 and the amphiphilic endless polymer 20 as shown in the upper part of FIG. 3. The mixed associate may be a vesicle or the like, other than a micelle. The mixed associate 51 has an arrangement in which the hydrophobic units faces toward the center of the core and the hydrophilic unit faces toward the outside as shown in the upper part of FIG. 3. The mixed aggregate 52 is a particle in which the amphiphilic linear polymer 10 and the amphiphilic endless polymer 20 are aggregated as shown in the lower part of FIG. 3.

The thermochromic resin composite 3 reversibly changes between the transparent state and the opaque state due to the change between the mixed associate 51 and the mixed aggregate 52 as shown in FIG. 3.

It is considered that the mixed aggregate 52 is formed as a result that the hydrophobic units 12 of the amphiphilic linear polymer 10 increases in mobility under high temperature environment, and the hydrophobic units 12 of the amphiphilic linear polymers 10 exhibit interaction with each other in a plurality of mixed associates 51. In other words, an aggregate of a plurality of mixed associates 51 is formed near the clouding point. It is considered that the amphiphilic linear polymer enters into another micelle with an increase in the mobility at the end of a molecular chain due to the temperature rise, and bridging between micelles arises to thereby form an aggregate.

As the mixed aggregate 52 changes back to the mixed associate 51 such as a micelle due to the temperature drop, the opaque state also changes into the transparent state. Specifically, by reversibly changing between the mixed associate 51 and the mixed aggregate 52 depending on temperature, it is possible to reversibly change between the transparent state and the opaque state. Note that the clouding point is a value that can vary by the definition of the transmittance as described earlier, and it does not always coincide with the formation timing of the mixed associate 51 and the mixed aggregate 52.

A combination of the amphiphilic linear polymer 10 and the amphiphilic endless polymer 20 that form the mixed associate 51 and the mixed aggregate 52 is not particularly limited; however, it is preferred that the hydrophobic unit or/and the hydrophilic unit are the same between those polymers. The condition that "the hydrophobic unit is the same" or "the hydrophilic unit is the same" includes the case where structural details that do not affect the associate state are different. For example, the case having a structural difference such as a difference in molecular weight or a difference in substituent which does not affect the associate state is included in the case where the hydrophobic unit is the same or where the hydrophilic unit is the same.

In the formation of the mixed associate 51, it is more preferred that the hydrophobic unit that gives a larger impact on associate formation is the same, and it is further preferred that both of the hydrophobic unit and the hydrophilic unit are common between the amphiphilic linear polymer 10 and the amphiphilic endless polymer 20.

It is particularly preferred that the amphiphilic linear polymer 10 is a precursor of the amphiphilic endless polymer 20. This can easily enhance the mixability between the amphiphilic linear polymer 10 and the amphiphilic endless polymer 20.

A preferred example of the amphiphilic linear polymer 10 is a chain polymer compound composed of a hydrophilic chain composed of the repeating unit of polyethylene oxide represented by the following general formula (1) where the hydrophilic unit contains polyethylene oxide and a hydrophobic chain composed of the repeating unit represented by the following general formula (2):

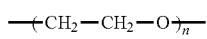

Formula (1)

where n indicates an integer of 10 to 500.

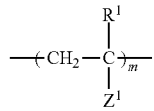

Formula (2)

where $R^1$ indicates a hydrogen atom, a halogen atom or a lower alkyl group, $Z^1$ indicates a hydrogen atom, a lower alkyl group, a perfluoroalkyl group, an alkyloxy group, a phenyl group substituted by a halogen atom, a lower alkyl group substituted by a halogen atom, an alkyloxy group substituted by a halogen atom, a cyano group, or a group represented by —$COOY^1$ (where $Y^1$ indicates a hydrogen atom or a hydrocarbon group), and m indicates an integer of 1 to 500.

A preferred example of the amphiphilic endless polymer 20 is a ring polymer compound composed of each repeating unit represented by the following general formula (3):

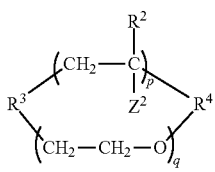

Formula (3)

where $R^2$ indicates a hydrogen atom, a halogen atom or a lower alkyl group, $Z^2$ indicates a hydrogen atom, a lower alkyl group, a perfluoroalkyl group, an alkyloxy group, a phenyl group substituted by a halogen atom, a lower alkyl group substituted by a halogen atom, an alkyloxy group substituted by a halogen atom, a cyano group, or a group represented by —$COOY^2$ (where $Y^2$ indicates a hydrogen atom or a hydrocarbon group), p indicates an integer of 1 to 500, and q indicates an integer of 10 to 500. $R^3$ and $R^4$ each indicate a straight-chain, branched, or ring low molecular chain.

Further, a preferred example of the amphiphilic endless polymer 20 is a ring polymer compound composed of each repeating unit represented by the following general formula (4):

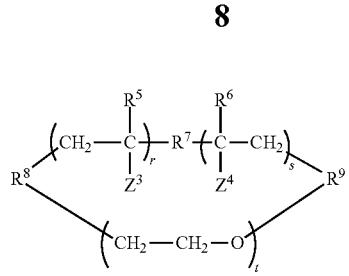

Formula (4)

where $R^5$ and $R^6$ each independently indicate a hydrogen atom, a halogen atom or a lower alkyl group, $Z^3$ and $Z^4$ each independently indicate a hydrogen atom, a lower alkyl group, a perfluoroalkyl group, an alkyloxy group, a phenyl group substituted by a halogen atom, a lower alkyl group substituted by a halogen atom, an alkyloxy group substituted by a halogen atom, a cyano group, or a group represented by —$COOY^3$ (where indicates $Y^3$ indicates a hydrogen atom or a hydrocarbon group). r and s each independently indicate an integer of 1 to 500, and t indicates an integer of 10 to 500. $R^7$, $R^8$ and $R^9$ each independently indicate a straight-chain, branched, or ring low molecular chain.

In the case of applying the above formula (3) or (4) as the amphiphilic endless polymer, it is preferred that its main skeleton is common to the above formula (1) and (2) in terms of the rationalization of a synthesis step and the mixability (compatibility) between the amphiphilic endless polymer and the amphiphilic linear polymer. Specifically, it is preferred that $R^1$ and $R^2$, $R^5$ and $R^6$ are common, and $Z^1$ and $Z^2$, $Z^3$ and $Z^4$ use a common unit.

The amphiphilic linear polymer 10 can be easily obtained by the block copolymerization of a hydrophilic polymer and a hydrophobic polymer. For example, it can be obtained by mixing one or two or more kinds of monomers, which are a material of a block copolymer, and a polymerization initiator and then making the polymerization reaction proceed under conditions such as heating. In the case of using one kind of monomer for the polymerization reaction, a block copolymer can be synthesized by adding another monomer. The polymerization reaction can be made in a polymerization solvent. As the polymerization initiator, a known initiator can be used without limitation. Further, as the polymerization initiator, a macroinitiator may be used. In the case of using the macroinitiator, a block copolymer can be obtained only by polymerizing one kind of monomer.

The amphiphilic endless polymer can be easily obtained by introducing functional groups to form a covalent bond at two points in a block copolymer molecule and making the functional groups bonded together. For example, in the example of introducing an allyl group at the both ends of a molecular chain of the amphiphilic linear polymer 10, based on which the amphiphilic endless polymer 20 is formed, covalent immobilization is done at the both ends under dilute conditions and in the presence of Grubbs catalyst in a solvent, and thereby a polymer compound having a ring polymer structure can be generated efficiently. Alternatively, a known method for obtaining a ring polymer may be applied without limitation.

The amphiphilic linear polymer is not particularly limited as long as it is a chain at least at the polymer ends, has a hydrophilic unit and a hydrophobic unit, and satisfies the above-described combined condition with the amphiphilic endless polymer. Preferred examples include, in addition to the structure of 2A, the structures of FIGS. 4A to 4H. An amphiphilic linear polymer 10a in FIG. 4A has a structure in which a linear hydrophobic unit 12a is at one end of a linear hydrophilic unit 11a. An amphiphilic linear polymer 10b in FIG. 4B is composed of three chain polymers and has a structure in which two hydrophobic units 12b branch out at one end of one linear hydrophilic unit 11b.

Figure 4A:
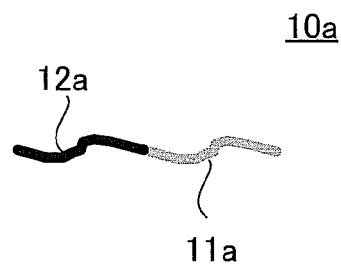
FIG. 4A is a schematic view of an amphiphilic linear polymer according to an alternative example.
Figure 4B:
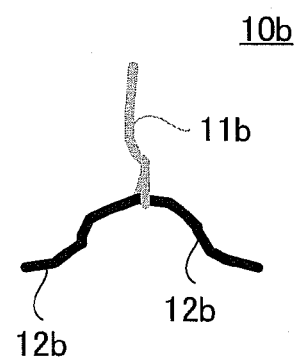
FIG. 4B is a schematic view of an amphiphilic linear polymer according to an alternative example.
Figure 4C:
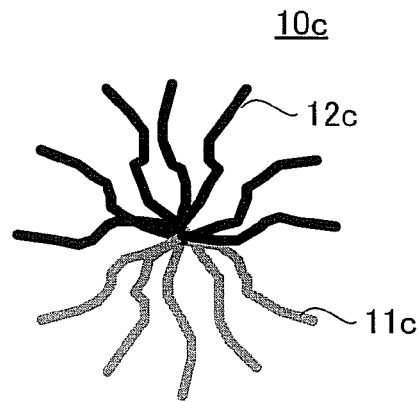
FIG. 4C is a schematic view of an amphiphilic linear polymer according to an alternative example.
Figure 4D:
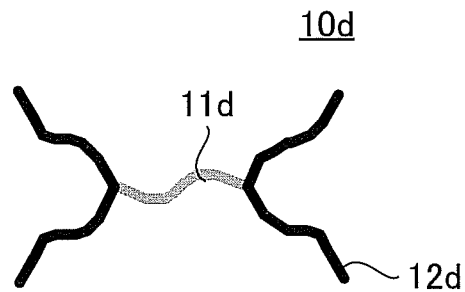
FIG. 4F is a schematic view of an amphiphilic linear polymer according to an alternative example.
FIG. 4E is a schematic view of an amphiphilic linear polymer according to an alternative example.
FIG. 4G is a schematic view of an amphiphilic linear polymer according to an alternative example.
FIG. 4H is a schematic view of an amphiphilic linear polymer according to an alternative example.
Figure 4E:
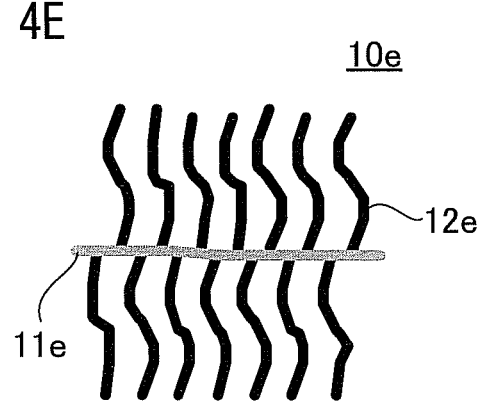
Figure 4F:
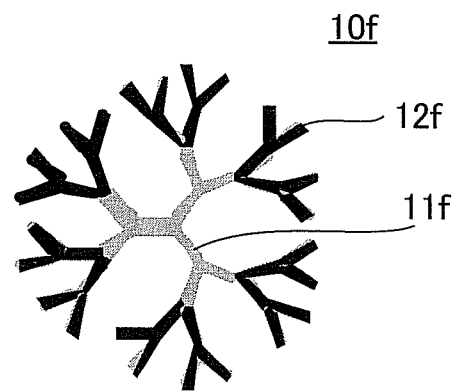

An amphiphilic linear polymer 10c in FIG. 4C has a star polymer structure in which a plurality of hydrophilic units 11c and a plurality of hydrophobic units 12c branch out at substantially the center position. An amphiphilic linear polymer 10d in FIG. 4D has a structure in which two hydrophobic units 12d branch out at the both ends of one hydrophilic unit 11d. An amphiphilic linear polymer 10e in FIG. 4E has a structure in which a plurality of hydrophobic units 12e branch out from one hydrophilic unit 11e. An amphiphilic linear polymer 10f in FIG. 4F has a structure in which a branch hydrophilic unit 11f is at the core and branch hydrophobic units 12f are placed at each end of the branch hydrophilic unit 11f.

Figure 4G:
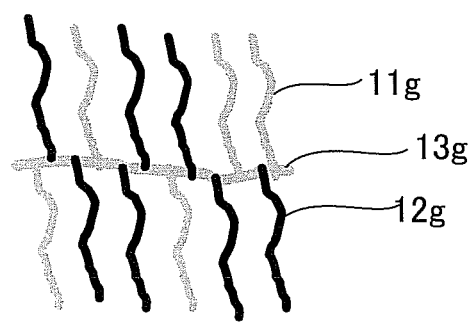
Figure 4H:
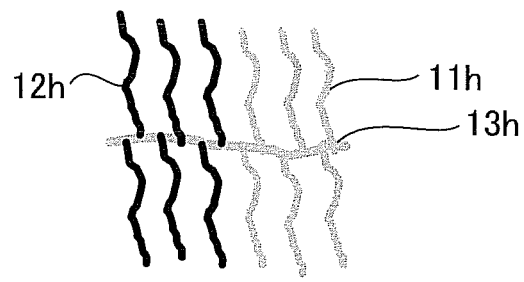

An amphiphilic linear polymer 10g in FIG. 4G has a structure having a plurality of side-chain hydrophobic units 12g from one hydrophilic unit 13g, and a plurality of hydrophilic units formed in a side chain at random positions from the one hydrophilic unit 13g. An amphiphilic linear polymer 10h in FIG. 4H has a structure having a plurality of hydrophobic units 12h formed in a side chain from a specific block of one hydrophobic unit 13h and a plurality of hydrophilic units 11h formed in a side chain in a block different from the block of one hydrophobic unit 13h. Note that FIGS. 4A to 4H are shown by way of illustration only, and various alterations are possible as a matter of course. For example, as long as a hydrophobic unit is formed at the end, an element other than a chain structure, such as a ring structure, may be contained in another part of the amphiphilic linear polymer.

The amphiphilic endless polymer is not particularly limited as long as it is an endless polymer, has a hydrophilic unit and a hydrophobic unit, and satisfies the above-described combined condition with the amphiphilic linear polymer. Preferred examples include, in addition to the structure of 2B, the structures of FIGS. 5A to 5G.

Figure 5A:
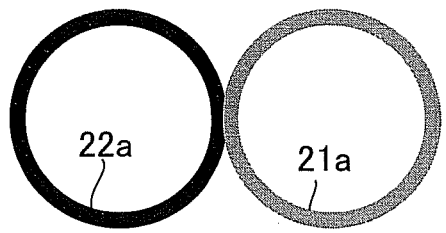
FIG. 5A is a schematic view of an amphiphilic endless polymer according to an alternative example.
Figure 5B:
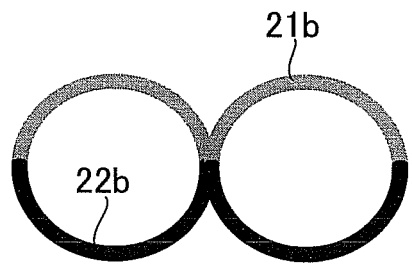
FIG. 5B is a schematic view of an amphiphilic endless polymer according to an alternative example.
Figure 5C:
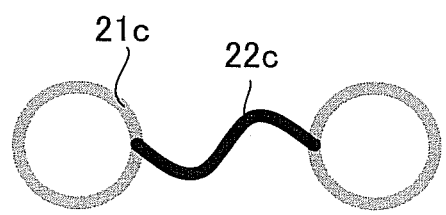
FIG. 5C is a schematic view of an amphiphilic endless polymer according to an alternative example.
Figure 5D:
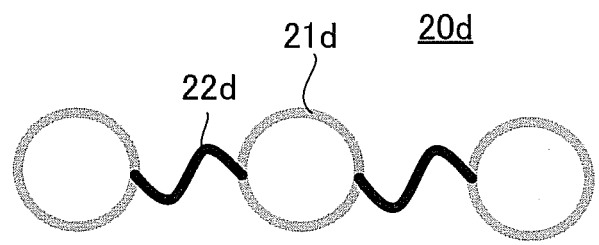
FIG. 5D is a schematic view of an amphiphilic endless polymer according to an alternative example.

An amphiphilic endless polymer 20a in FIG. 5A has a bicyclic structure in which a ring structure of a hydrophilic unit 21a and a ring structure of a hydrophobic unit 22a are bonded together. An amphiphilic endless polymer 20b in FIG. 5B has a bicyclic structure in which two ring structures composed of a hydrophilic unit 21b and a hydrophobic unit 22b are bonded together. An amphiphilic endless polymer 20c in FIG. 5C has a structure in which hydrophilic units 21c having a ring structure are bonded to the both ends of a linear hydrophobic unit 22c. An amphiphilic endless polymer 20d in FIG. 5D has a structure in which a linear hydrophobic unit and a ring hydrophilic unit are further added to the structure of FIG. 5C. Specifically, two linear hydrophobic units 22d are placed between three ring hydrophilic units 21d in this structure.

Figure 5E:
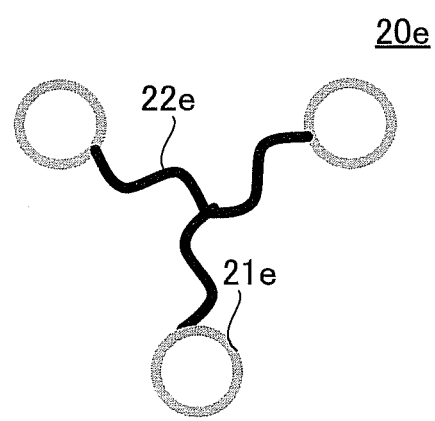
FIG. 5E is a schematic view of an amphiphilic endless polymer according to an alternative example.
Figure 5F:
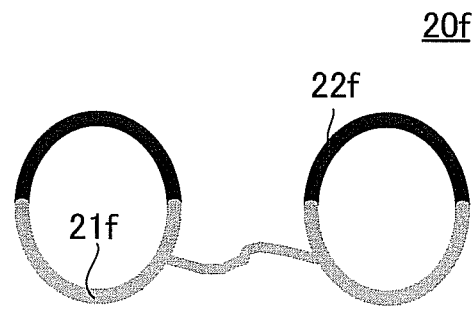
FIG. 5F is a schematic view of an amphiphilic endless polymer according to an alternative example.
Figure 5G:
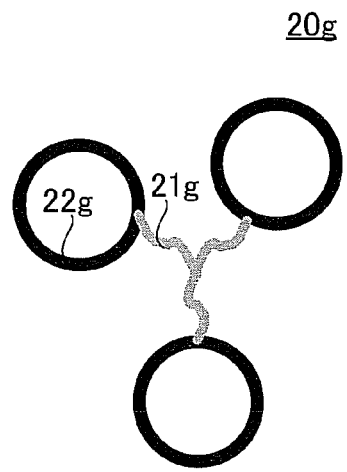
FIG. 5G is a schematic view of an amphiphilic endless polymer according to an alternative example.

An amphiphilic endless polymer 20e in FIG. 5E has a structure having three ring hydrophilic units 21e and linear hydrophobic units 22e extending from the ring hydrophilic units 21e and with their one ends bonded together. Further, like an amphiphilic endless polymer 20f in FIG. 5F, it may have a structure including a hydrophilic unit 21f composed of ring parts and a chain part and hydrophobic units 22f having ring structures. Furthermore, like an amphiphilic endless polymer 20g in FIG. 5G, it may have a structure including a plurality of hydrophobic unit 22g having a ring structure bonded to the end of chain hydrophilic units 21g. Note that FIGS. 5A to 5G are shown by way of illustration only, and various alterations are possible as a matter of course. For example, a catenane-like ring structure may be employed. Further, a bridging structure or the like may be included.

Note that the structure of the above general formulas (1) to (4) is not limited to the structure of FIGS. 2A and 2B, and it is suitably applicable to various structures including FIGS. 4A to 4G and FIGS. 5A to 5G.

By using the triblock structure as shown in FIG. 2A for the amphiphilic linear polymer, the speed of molecular exchange of an associate like a micelle is lower than that of the diblock structure of FIG. 4A where the hydrophobic unit has the same segment length. This is because a process that one hydrophobic unit moves out from the core of an associate like a micelle and further the other one hydrophobic unit moves out from the core is required. Thus, the triblock structure has an advantage over the diblock structure in that the stability of the associate is higher. Therefore, as a particularly preferred shape of the amphiphilic linear polymer that is applied to the thermochromic resin composite according to the present invention, the triblock structure composed of a linear hydrophilic unit and a linear hydrophobic unit bonded to both ends of the hydrophilic unit can be used.

As a method of adjusting the clouding point, one method is making adjustment by changing the polymer concentration exhibiting thermochromic properties in the aqueous medium. Another method is adjusting the clouding point using an additive such as a salt in the aqueous medium. However, in those methods, the adjustment is limited to a narrow temperature range.

On the other hand, according to the embodiment, by mixing the amphiphilic linear polymer and the amphiphilic endless polymer with different clouding points and further using a mixed associate, it is possible to adjust the clouding point over a wide temperature range. In other words, it is easy to significantly differentiate the two clouding points because of a difference in shape between the amphiphilic linear polymer and the amphiphilic endless polymer. Then, by using the mixed associate of those, it is possible to easily adjust a clouding point between the clouding point of the single amphiphilic linear polymer and the clouding point of the single amphiphilic endless polymer, in accordance with the mixing ratio. As a matter of course, the temperature may be adjusted using a chemical modification, an additive or the like in combination.

In addition, with use of an ambient temperature, it is possible to control light without using a special system such as a voltage application system like a liquid crystal dimmer, which achieves cost reduction. As a matter of course, a temperature control system may be used in combination, and the thermochromic resin composite according to the present invention can be applied as an optical element of the dimmer with the temperature control system.

According to the embodiment, the temperature of the clouding point can be designed easily, and it is thus possible to control the transparent state and the opaque state at a desired temperature according to purpose and need. It is therefore expected to significantly enlarge the use range of the dimmer.

Further, by forming an associate like a micelle, it is possible to give another function such as giving the ultraviolet scattering properties to the polymer constituting the thermochromic resin composite. Further, even if the polymer constituting the thermochromic resin composite does not have the ultraviolet scattering properties, the ultraviolet scattering effects are exerted by scattering as a result of forming an associate, and therefore it can be used also as a material combining the dimming function and the ultraviolet scattering function.

Note that, although it is described that the thermochromic resin composite is predominantly composed of the aqueous medium, the amphiphilic linear polymer and the amphiphilic endless polymer, an additive such as a colorant, a dispersion stabilizer and a metal particle can be added as appropriate. Further, a hydrophobic substance or the like may be contained in the mixed associate 51. Further, although the transmittance of the clouding point is evaluated at 600 nm in this embodiment, this is one example, and the transmittance of the clouding point may be evaluated at a wavelength in another visible light region (400 nm to 800 nm) as a matter of course.

Note that although the example where the thermochromic resin composite is applied to a dimmer is described in this embodiment, the thermochromic resin composite according to the embodiment is applicable to various uses, not only applied as an optical element of the dimmer. For example, it is suitably applicable to an electronics material, a functional material and the like.

EXAMPLES

The present invention is described hereinafter with reference to examples. However, the present invention is not restricted by the following examples. A polymer according to the embodiment can be easily synthesized by the method disclosed in Non Patent Literature 1, for example.

Synthesis of Amphiphilic Linear Polymer

Polyethylene oxide (400 mg) with a 2-bromoisobutyryl group at both ends, butylacrylate (3 mL), copper(I) bromide (20 mg), and 4,4'-dinonyl-2,2'-bipyridine (160 mg) were mixed, and atom transfer radical polymerization was carried out at 90° C. for 3 hours. After that, allyltributyltin (1.2 mL) was added and, through agitation at 90° C. for 16 hours, poly(butylacrylate-b-ethylene oxide-b-butylacrylate) (235 mg) having a straight-chain polymer structure (which is hereinafter referred to also as "L1 polymer") was obtained.

Synthesis of Amphiphilic Endless Polymer

The above L1 polymer (100 mg) and Grubbs catalyst first generation (20 mg) were dissolved into 200 mL of methylene chloride and, through reflux for 48 hours, poly(butylacrylate-b-ethylene oxide) (64 mg) having a endless polymer structure (which is hereinafter referred to also as "C1 polymer") was obtained.

Then, the L1 polymer was added to water to prepare a 0.5 mg/mL aqueous solution (which is hereinafter referred to as "thermochromic resin composite A"), and the C1 polymer was added to water to prepare a 0.5 mg/mL aqueous solution (which is hereinafter referred to as "thermochromic resin composite B").

Example 1

The thermochromic resin composite A and the thermochromic resin composite B were mixed at the ratio of 3:1 to thereby prepare a thermochromic resin composite (which is hereinafter referred to as "thermochromic resin composite C").

Example 2

The thermochromic resin composite A and the thermochromic resin composite B were mixed at the ratio of 1:1 to thereby prepare a thermochromic resin composite (which is hereinafter referred to as "thermochromic resin composite D").

Example 3

The thermochromic resin composite A and the thermochromic resin composite B were mixed at the ratio of 1:3 to thereby prepare a thermochromic resin composite (which is hereinafter referred to as "thermochromic resin composite E").

Figure 6:
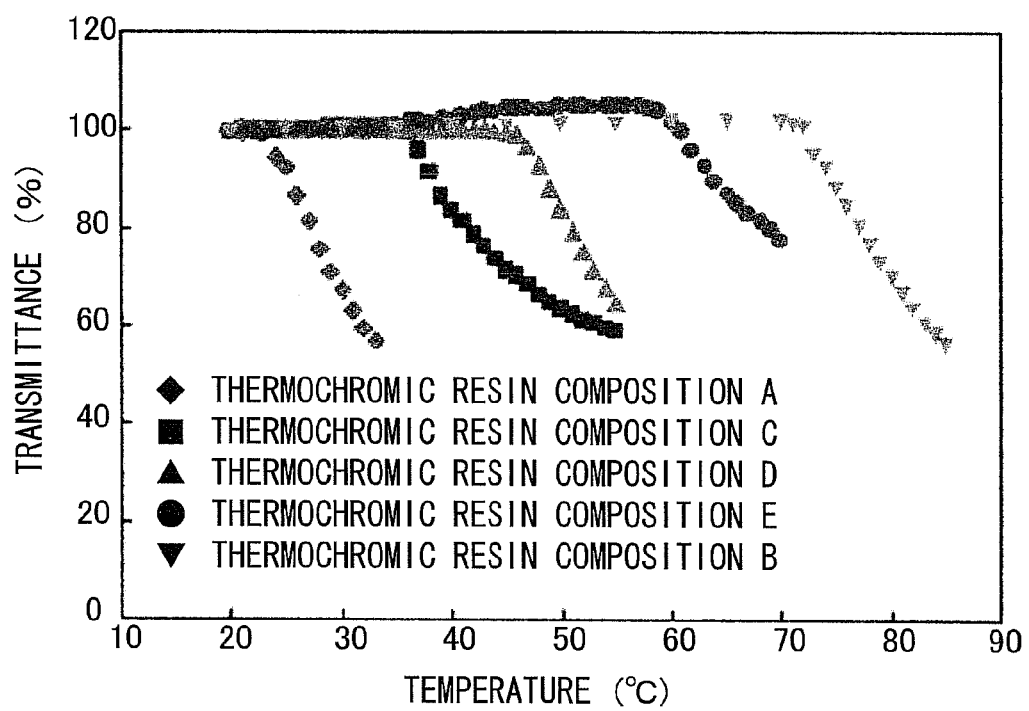
FIG. 6 is a view plotting the transmittance of thermochromic resin composites according to Examples 1 to 3 with respect to temperature.

For the thermochromic resin composite A to the thermochromic resin composite E, the visible light transmittance with respect to temperature was observed at 600 nm, using a spectrophotometer. FIG. 6 shows the result. As is obvious from the figure, the clouding point of the thermochromic resin composite A (L1 polymer) was 24° C., and the clouding point of the thermochromic resin composite B (C1 polymer) was 74° C. (see FIG. 6). Further, the clouding point of the thermochromic resin composite C in Example 1 was 38° C., and the clouding point of the thermochromic resin composite D in Example 2 was 48° C. Further, the clouding point of the thermochromic resin composite E in Example 3 was 63° C.

The reason that the clouding point of the thermochromic resin composite B was 74° C. while the clouding point of the thermochromic resin composite A was 24° C. is considered that the mobility at the end of a molecular chain is higher in the L1 polymer than in the C1 polymer.

In Examples 1 to 3 where the L1 polymer and the C1 polymer were mixed, a single clouding point was observed in each case. If a micelle of the L1 polymer and a micelle of the C1 polymer are formed independently, their respective clouding points should be observed. However, in actuality, only one clouding point was observed as shown in FIG. 6. This indicates that, in the thermochromic resin composite of Examples 1 to 3, the L1 polymer and the C1 polymer form a mixed associate.

Further, it is also found that, in the thermochromic resin composite of Examples 1 to 3, the clouding point can be designed easily within the range of the clouding point of the L1 polymer and the clouding point of the C1 polymer, depending on the mixing ratio of the L1 polymer to the C1 polymer.

Figure 7:
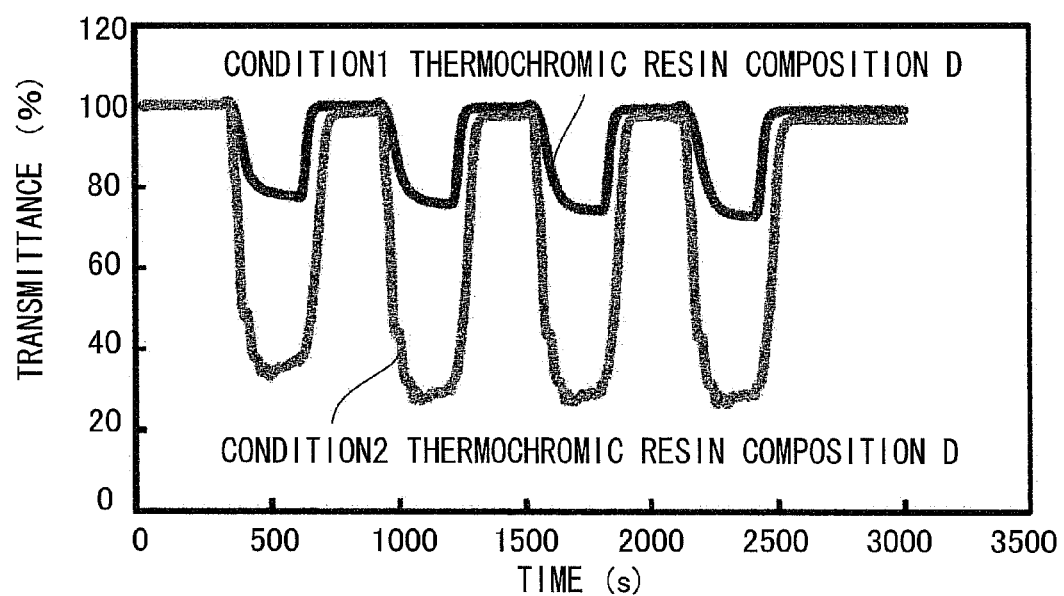
FIG. 7 is a view showing a change in the transmittance of a thermochromic resin composite D according to Example 2 in a temperature cycle of lower than a clouding point and equal to or higher than the clouding point.

FIG. 7 is a view plotting the change in the transmittance of the thermochromic resin composite D according to Example 2 at 600 nm when the temperature cycle of the clouding point or higher and lower than the clouding point was repeated. FIG. 7 shows a condition 1 where the temperatures of 42° C. (lower than the clouding point) and 52° C. (the clouding point or hither) are repeated every 300 s and a condition 2 where the temperatures of 42° C. (lower than the clouding point) and 78° C. (the clouding point or hither) were repeated every 300 s.

It is found from FIG. 7 that, when the temperature cycle of 42° C. (lower than the clouding point) and 52° C. (the clouding point or hither) was repeated, the transmittance range of 20% or more can be controlled repeatedly. Further, when the temperature cycle of 42° C. (lower than the clouding point) and 78° C. (the clouding point or hither) was repeated, the transmittance range of 60% or more can be controlled repeatedly.

Figure 8A:
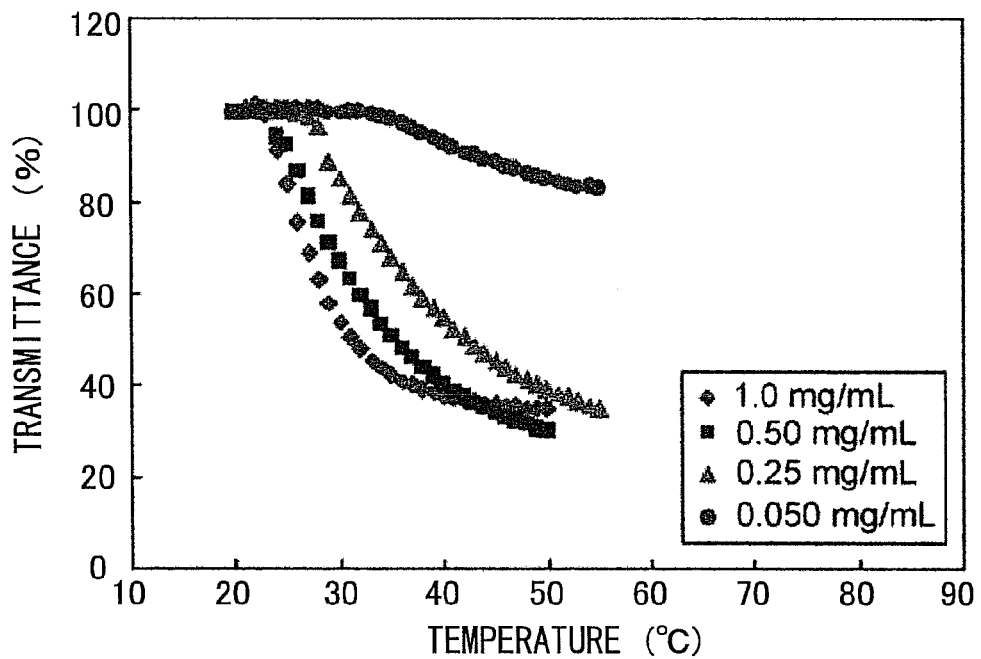
FIG. 8A is a view showing the transmittance with respect to temperature in the case where the concentration of L1 polymer is changed.
Figure 8B:
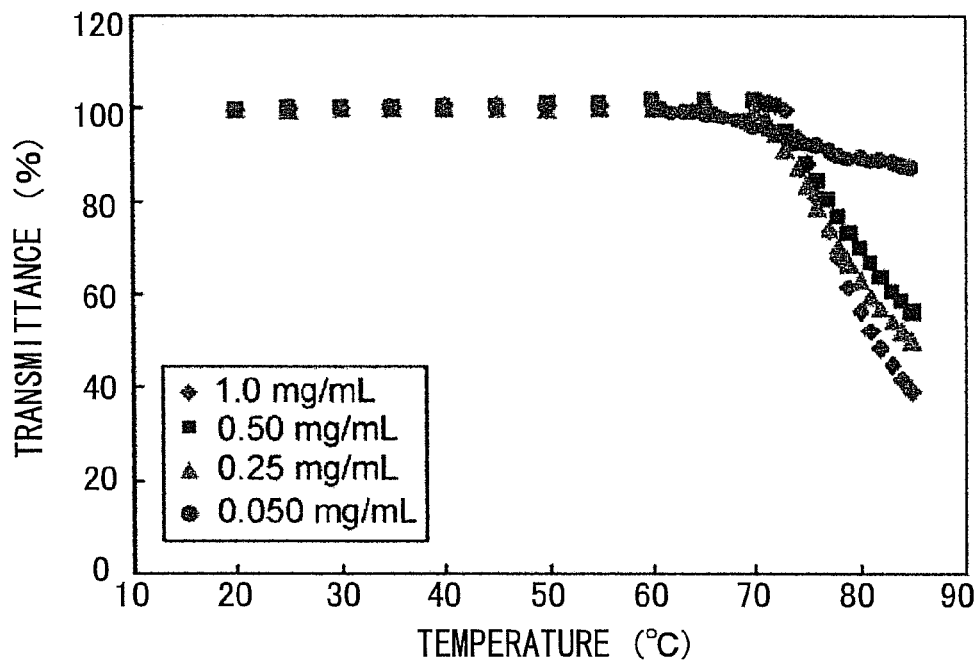
FIG. 8B is a view showing the transmittance with respect to temperature in the case where the concentration of C1 polymer is changed.

FIG. 8A shows a result of observing the visible light transmittance with respect to temperature at 600 nm in the case where the concentration of the solution of the L1 polymer was changed. FIG. 8B shows a result of observing the visible light transmittance with respect to temperature at 600 nm in the case where the concentration of the solution of the C1 polymer was changed. As shown in FIGS. 8A and 8B, the clouding point can be adjusted by changing the solution concentration even with the single L1 polymer and the single C1 polymer. However, the range of adjustment is small. On the other hand, in Examples 1 to 3 according to the present invention, as shown in FIG. 6, the clouding point can be adjusted over a wide range. In the thermochromic resin composite according to Examples 1 to 3, fine adjustment of the clouding point can be additionally made by adjusting the solution concentration.

Figure 9:
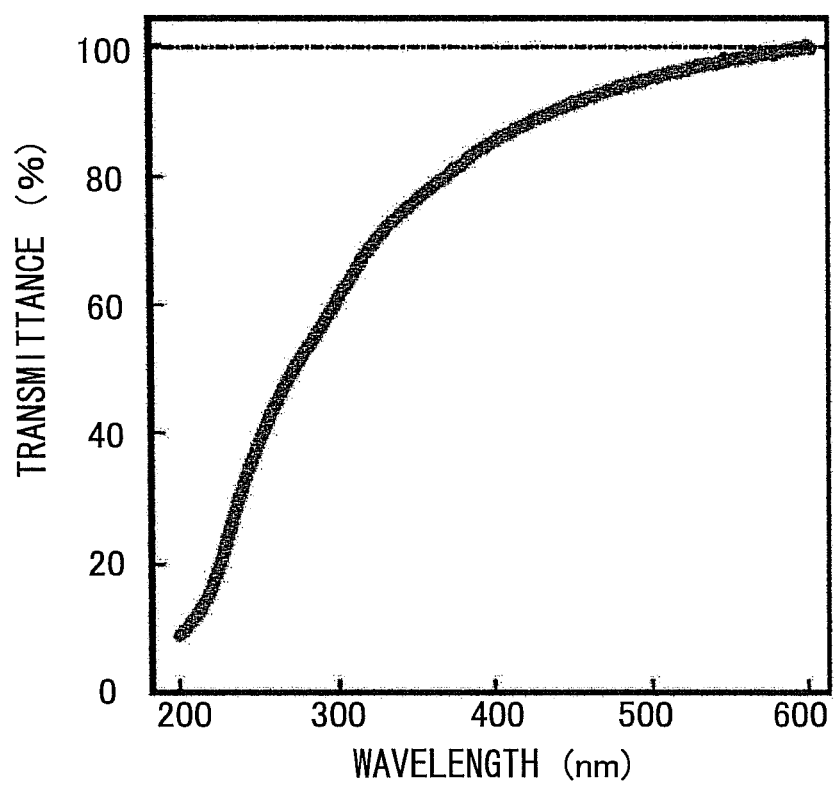
FIG. 9 is an absorption spectrum diagram of a thermochromic resin composite A.

FIG. 9 shows a result of measuring the absorption spectrum of the thermochromic resin composite A using a spectrophotometer. Because the transmittance is as high as 90% or higher in the visible light region, and the transmittance is as low as 50% or lower in the ultraviolet region (300 nm or less), ultraviolet rays are scattered efficiently. Although the L1 polymer does not have an ultraviolet absorption portion such as a benzene ring, the ultraviolet scattering effect by scattering is exerted by forming the associate. The same result is obtained also for the thermochromic resin composites B to E. Therefore, the thermochromic resin composite according to the present invention is also applicable as a material combining the dimming function and the ultraviolet scattering function.

Example 4

Then, the L1 polymer (50 mg) was dissolved into THF (1 ml), and distilled water (0.5 ml) was distilled. After adding all, the THF was removed by vacuum distillation to thereby prepare a gel thermochromic resin composite (which is hereinafter referred to as "thermochromic resin composite F"). Further, the C1 polymer (50 mg) was dissolved into THF (1 ml), and distilled water (0.5 ml) was distilled. After adding all, the THF was removed by vacuum distillation to thereby prepare a gel thermochromic resin composite (which is hereinafter referred to as "thermochromic resin composite G").

Example 5

The L1 polymer (30 mg) and the C1 polymer (30 mg) were dissolved into THF (1 ml), and distilled water (0.5 ml) was distilled. After adding all, the THF was removed by vacuum distillation to thereby prepare a gel thermochromic resin composite (which is hereinafter referred to as "thermochromic resin composite H"). Although this example is the same as Example 2 in the mixing ratio of the L1 polymer to the C1 polymer, they are different in that the thermochromic resin composite is gel-based in Example 5 while it is not gel-based in Example 2.

Each of the thermochromic resin composite F to the thermochromic resin composite H was applied onto a quartz cell, and the visible light transmittance with respect to temperature was observed at 600 nm using a spectrophotometer. While the transmittance of the thermochromic resin composite F was 89.4% at room temperature (20° C.), the transmittance of the sample heated at 30° C. for 5 minutes was changed to 30.6%. Further, while the transmittance of the thermochromic resin composite G was 68.7% at room temperature, the transmittance of the sample heated at 80° C. for 5 minutes was 62.3%. Furthermore, while the transmittance of the thermochromic resin composite H was 91.5% at room temperature, the transmittance of the sample heated at 50° C. for 5 minutes was 55.8%. Although the stable data was not obtained because the thermochromic resin composite F to the thermochromic resin composite H were heterogeneous system, it was found that any of them returned to the transparent state.

This application is based upon and claims the benefit of priority from Japanese patent application No. 2010-145198, filed on Jun. 25, 2010, the disclosure of which is incorporated herein in its entirety by reference.

INDUSTRIAL APPLICABILITY

The thermochromic resin composite according to the present invention is suitably applicable to a dimmer that controls transparency and opacity and the like. The dimmer using the thermochromic resin according to the present invention can control light without using a voltage application system or the like, and it is thus possible to achieve cost reduction and energy saving.

REFERENCE SIGNS LIST

1 FIRST LIGHT TRANSMITTING PLATE
2 SECOND LIGHT TRANSMITTING PLATE
3 THERMOCHROMIC RESIN COMPOSITE
4 SEALING MATERIAL
10 AMPHIPHILIC LINEAR POLYMER
11 HYDROPHILIC UNIT
12 HYDROPHOBIC UNIT
20 AMPHIPHILIC ENDLESS POLYMER
21 HYDROPHILIC UNIT
22 HYDROPHOBIC UNIT
51 MIXED ASSOCIATE
52 MIXED AGGREGATE
100 DIMMER

The invention claimed is:

1. A thermochromic resin composite predominantly comprising: an aqueous medium; an amphiphilic linear polymer changeable between a transparent state and an opaque state in the aqueous medium depending on temperature; and an amphiphilic endless polymer changeable between a transparent state and an opaque state in the aqueous medium depending on temperature, wherein the amphiphilic linear polymer and the amphiphilic endless polymer in the aqueous medium have one clouding point, the clouding point changing in accordance with a mixing ratio of the amphiphilic linear polymer to the amphiphilic endless polymer.

2. The thermochromic resin composite according to claim 1, wherein a hydrophobic unit or/and a hydrophilic unit is the same between the amphiphilic linear polymer and the amphiphilic endless polymer.

3. The thermochromic resin composite according to claim 1, wherein the amphiphilic linear polymer is a single-chain polymer, and the amphiphilic endless polymer is a single-ring polymer.

4. The thermochromic resin composite according to claim 1, wherein the amphiphilic linear polymer is comprised of a linear hydrophilic unit and linear hydrophobic units bonded to both ends of the hydrophilic unit.

5. The thermochromic resin composite according to claim 1, wherein the amphiphilic linear polymer is a precursor of the amphiphilic endless polymer.

6. The thermochromic resin composite according to claim 1, wherein the amphiphilic linear polymer is comprised of a hydrophilic chain comprised of a repeating unit of polyethylene oxide represented by a general formula (1) and a hydrophobic chain comprised of a repeating unit represented by a general formula (2):

Formula (1)

where n indicates an integer of 10 to 500,

Formula (2)

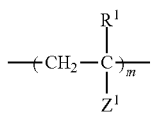

where $R^1$ indicates a hydrogen atom, a halogen atom or a lower alkyl group, $Z^1$ indicates a hydrogen atom, a lower alkyl group, a perfluoroalkyl group, an alkyloxy group, a phenyl group substituted by a halogen atom, a lower alkyl group substituted by a halogen atom, an alkyloxy group substituted by a halogen atom, a cyano group, or a group represented by —$COOY^1$, m indicates an integer of 1 to 500, and $Y^1$ indicates a hydrogen atom or a hydrocarbon group.

7. The thermochromic resin composite according to claim 1, wherein the amphiphilic endless polymer is a ring polymer compound comprised of each repeating unit represented by a general formula (3) or a general formula (4):

Formula (3)

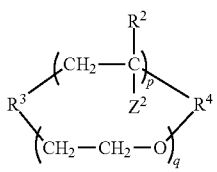

where $R^2$ indicates a hydrogen atom, a halogen atom or a lower alkyl group, $Z^2$ indicates a hydrogen atom, a lower alkyl group, a perfluoroalkyl group, an alkyloxy group, a phenyl group substituted by a halogen atom, a lower alkyl group substituted by a halogen atom, an alkyloxy group substituted by a halogen atom, a cyano group, or a group represented by —$COOY^2$, $Y^2$ indicates a hydrogen atom or a hydrocarbon group, p indicates an integer of 1 to 500, q indicates a integer of 10 to 500, and $R^3$ and $R^4$ each indicate a straight-chain, branched, or ring low molecular chain, Formula (4)

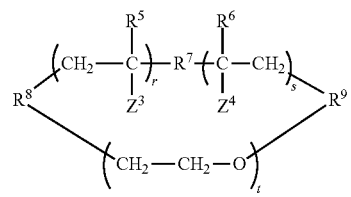

where $R^5$ and $R^6$ each indicate a hydrogen atom, a halogen atom or a lower alkyl group, $Z^3$ and $Z^4$ each indicate a hydrogen atom, a lower alkyl group, a perfluoroalkyl group, an alkyloxy group, a phenyl group substituted by a halogen atom, a lower alkyl group substituted by a halogen atom, an alkyloxy group substituted by a halogen atom, a cyano group, or a group represented by —$COOY^3$, $Y^3$ indicates a hydrogen atom or a hydrocarbon group, r and s each indicate an integer of 1 to 500, t indicates an integer of 10 to 500, and $R^7$, $R^8$ and $R^9$ each indicate a straight-chain, branched, or ring low molecular chain.

8. A dimmer including an optical element having a light transmittance decreasing at high temperature and increasing at low temperature, the dimmer comprising the thermochromic resin composite according to claim 1 as the optical element.

9. A method for adjusting a clouding point of a thermochromic resin composite, comprising:
preparing an amphiphilic linear polymer having a clouding point A at which a transparent state and an opaque state change reversibly in an aqueous medium depending on temperature, and an amphiphilic endless polymer having a clouding point B at which a transparent state and an opaque state change reversibly in the aqueous medium depending on temperature; and
adjusting a mixing ratio of the amphiphilic linear polymer to the amphiphilic endless polymer mixed in the aqueous medium so as to have a desired clouding point C at which a transparent state and an opaque state change reversibly, the clouding point C being different from the clouding point A and the clouding point B and within a temperature range of the clouding point A and the clouding point B.

\* \* \* \* \*